US007120013B1

(12) United States Patent
Hutchings, IV et al.

(10) Patent No.: US 7,120,013 B1
(45) Date of Patent: Oct. 10, 2006

(54) SYSTEM AND METHOD FOR TRANSFERRING LARGE AMOUNTS OF STORED DATA

(75) Inventors: Henry Hutchings, IV, Richardson, TX (US); William W. Kaake, Jr., Wylie, TX (US); Jeffrey K. Fields, Rowlett, TX (US); Tunney A. Dong, Dallas, TX (US); Kevin Lee Balch, Rowlett, TX (US); Rosemarie Spencer, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 358 days.

(21) Appl. No.: 10/411,745

(22) Filed: Apr. 11, 2003

(51) Int. Cl.
*G06F 1/16* (2006.01)
(52) U.S. Cl. .................... 361/685; 361/684
(58) Field of Classification Search ......... 361/684–685
See application file for complete search history.

(56) References Cited

U.S. PATENT DOCUMENTS

| 5,488,575 A | * | 1/1996 | Danielson et al. ..........713/321 |
| 5,576,936 A | | 11/1996 | Brorby |
| 5,684,671 A | | 11/1997 | Hobbs et al. |
| 5,829,130 A | * | 11/1998 | Miller ...........................29/868 |
| 6,084,768 A | | 7/2000 | Bolognia |
| 6,321,298 B1 | | 11/2001 | Hubis |
| 6,876,400 B1 | * | 4/2005 | Schnellenberger ..........348/725 |

FOREIGN PATENT DOCUMENTS

WO          WO 00/49487           8/2000

OTHER PUBLICATIONS

Notification of Transmittal of the International Search Report and the Written Opinion of the International Searching Authority of International application No. PCT/US2004/000532, filed Jan. 8, 2004, (12 pages), May 30, 2005.
CIPRICO, Talon™ 1000, Delivery High I/O "Ruggedized Storage for Military and Commercial Applications", www.ciprico.com, Apr. 10, 2002.

* cited by examiner

*Primary Examiner*—Yean-Hsi Chang
(74) *Attorney, Agent, or Firm*—Baker Botts L.L.P.

(57) ABSTRACT

According to an embodiment of the present invention, a method for transferring a large amount of stored data includes storing the large amount of data on a plurality of RAID's in a storage area network in a first location, each of the RAID's having one or more disk packs, receiving a request for a portion of the stored data from a second location downloading the requested stored data at the first location to at least one disk pack, and sending the disk pack to the data requester at the second location, whereby the data requester can start using the data substantially immediately upon receipt.

11 Claims, 2 Drawing Sheets

SYSTEM AND METHOD FOR TRANSFERRING LARGE AMOUNTS OF STORED DATA

TECHNICAL FIELD OF THE INVENTION

This invention relates in general to storage of large amounts of data and, more particularly, to a system and method for transferring large amounts of stored data for plug-and-play capability.

BACKGROUND OF THE INVENTION

Many entities, such as the military and large corporations, often have a need for vast amounts of data. In addition, these vast amounts of data sometimes need to be transported to another location. For example, a military base may switch locations and have a need for imagery data of the new location. The new imagery data is downloaded onto 8 mm tapes and shipped to the new location. The 8 mm tapes are then downloaded to storage devices at the new location, which oftentimes takes days to complete because of the storage capacity needed for the new information. This wastes considerable time and, needless to say, very important time.

Another example is when a large corporation has a storage area network storing vast amounts of data in one location and this data needs to be moved to another location. The storage area network is disassembled and shipped in pieces to the new location for reassembly. This also wastes considerable time and money.

SUMMARY OF THE INVENTION

According to an embodiment of the present invention, a method for transferring a large amount of stored data includes storing the large amount of data on a plurality of RAID's in a storage area network in a first location, each of the RAID's having one or more disk packs, receiving a request for a portion of the stored data from a second location downloading the requested stored data at the first location to at least one disk pack, and sending the disk pack to the data requester at the second location, whereby the data requester can start using the data substantially immediately upon receipt.

According to another embodiment of the present invention, a system for transferring a large amount of stored data includes a transit case, a plurality of large capacity storage devices housed within the transit case, each large capacity storage device capable of storing at least approximately 200 gigabytes of data, and an uninterruptible power supply associated with the transit case. In one embodiment, the transit case includes a housing, a front cover selectively removable from the housing, shock isolators associated with the large capacity storage devices and operable to reduce shock loading encountered by the large capacity storage devices during transportation of the transit case, a seal disposed around a perimeter of the front cover, and a plurality of wheels coupled to the housing.

Embodiments of the invention provide a number of technical advantages. Embodiments of the invention may include all, some, or none of these advantages. One technical advantage is that a large amount of requested data from a first location may be downloaded at a central location onto large capacity storage devices that may be shipped to the first location for immediate use by merely "plugging in" the requested data and avoiding any lengthy downloading, thereby saving important time. Having this "plug-and-play" capability is particularly important in military applications where the data is often very large and bases could be moved at a moment's notice. In one embodiment, the use of RAIDs (Redundant Array of Independent Disks), significantly reduces loss of data. In one embodiment, a portable storage area network may be utilized to transport large amounts of data to another location. A storage area network, which is for fixed installations, may be made portable by providing one or more large capacity storage devices that have the ability to store vast amounts of data in a transit case that is designed and built for transportation.

A transit case according to one embodiment of the invention significantly improves transportability of a large volume of data that can be immediately used by personnel in the field, such as a military base in a foreign country. In other words, an embodiment of the invention provides plug-and-play capability for important data. This eliminates wasted time when downloading information from multiple 8 mm tapes, which could take many hours, if not days to accomplish. A transit case according to an embodiment of the invention is built for air travel by having shock isolators to protect the data therein from shock and vibration loads, seals to protect the data therein from any adverse environment, and a pressure relief valve to handle air travel at high altitudes. The transit case may also have wheels associated therewith to facilitate ease of mobility. In addition, the transit case is sized be compatible with a pallet used for air travel.

Other technical advantages are readily apparent to one skilled in the art from the following figures, descriptions, and claims.

BRIEF DESCRIPTION OF THE DRAWINGS

A better understanding of the present invention is realized from the detailed description that follows, taken in conjunction with the accompanying drawings, in which.

DETAILED DESCRIPTION OF THE INVENTION

Figure 1:
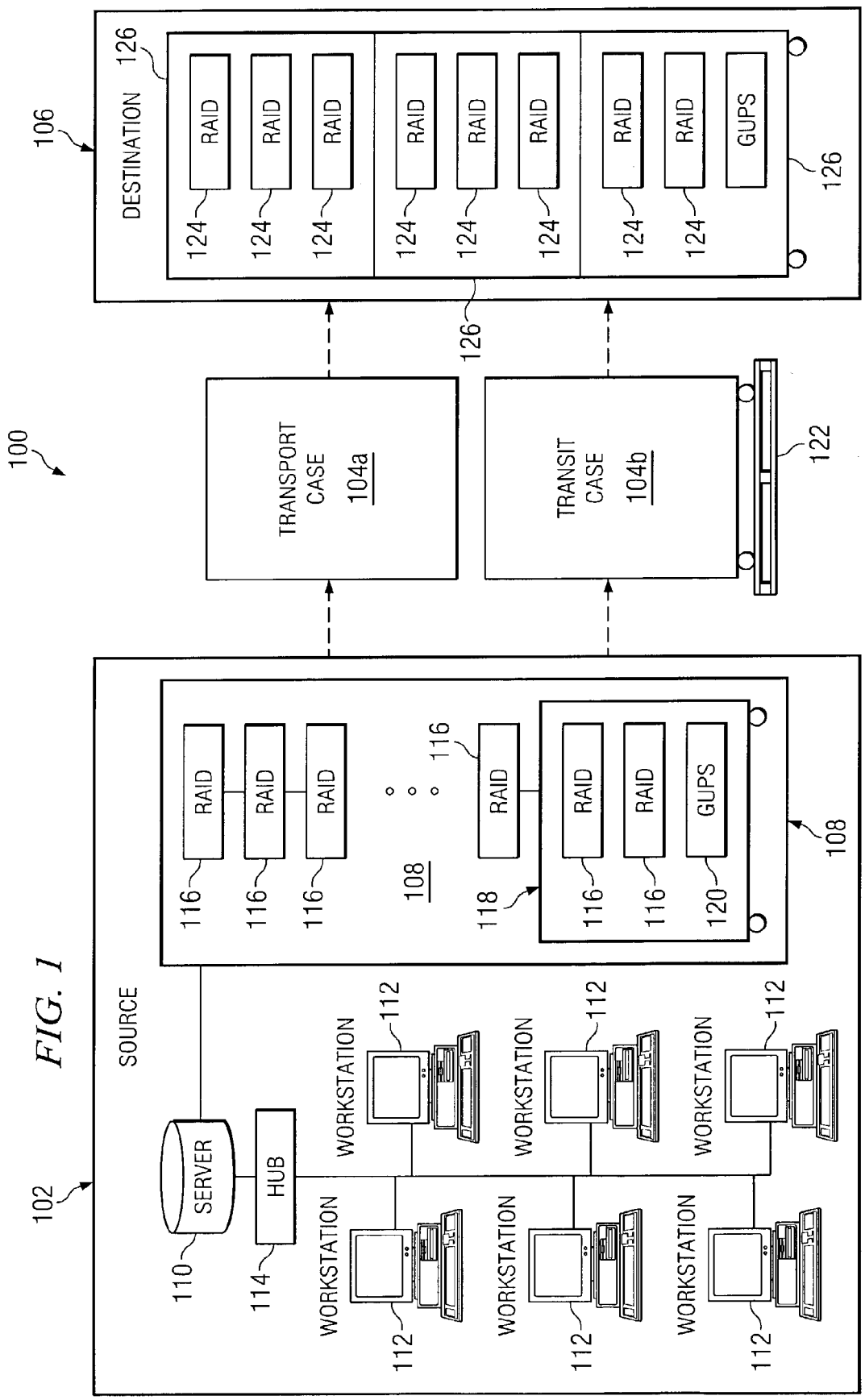
FIG. 1 is schematic of a system for transferring large amounts of stored data in accordance with one embodiment of the present invention.

FIG. 1 is a schematic of a system 100 for transferring large amounts of stored data in accordance with one embodiment of the present invention. In the illustrated embodiment, system 100 includes a source 102, a transportation device 104, and a destination 106. Generally, source 102 is where the data is stored and destination 106 is where the data is to be sent. Transportation device 104 is the means for getting the data from source 102 to destination 106. Each of these elements are described in further detail below.

Source 102 is where data is stored. Although the data could be stored in many different physical locations, for ease of description, data is described herein as being located in one physical location. Source 102 includes a storage area network 108, a server 110, and a plurality of work stations 112 coupled to server 110 via a hub 114.

Storage area network 108 includes a plurality of large capacity storage devices 116 that store data. Large capacity storage devices 116 may store any suitable data. For example, in military applications, large capacity storage devices 116 may store imagery data regarding area of interests ("AOIs"). In a particular embodiment, these AOIs are from the digital point precision data base ("DPPDB") at the national imagery and mapping agency ("NIMA"). As a commercial example, large capacity storage devices 116 may store data used in complex CAD/CAM software used by a large company such as Ford or General Motors to build a particular automobile. In any event, large capacity storage devices 116 may be any suitable large capacity storage devices that function to store vast amounts of data.

Each large capacity storage device 116, in one embodiment, stores one or more terabytes of data. In a particular embodiment, each large capacity storage device 116 stores at least 1.6 terabytes of data. As examples, large capacity storage devices 116 may includes RAIDs ("redundant array of independent disks"), JBODs ("just a bunch of disks"), optical disks, solid state recorders, or any other suitable storage media that functions to store vast amounts of data. It is preferable to use RAIDs because of the nature of how RAIDs store data. Typically, each RAID is comprised of a plurality of disk drives and the data is written over the disk drives in such a way that if data on one of the disk drives is lost it can be recovered from another of the disk drives. In one embodiment, a particular RAID is comprised of a plurality of disk packs that house a plurality of disk drives.

Figure 3:
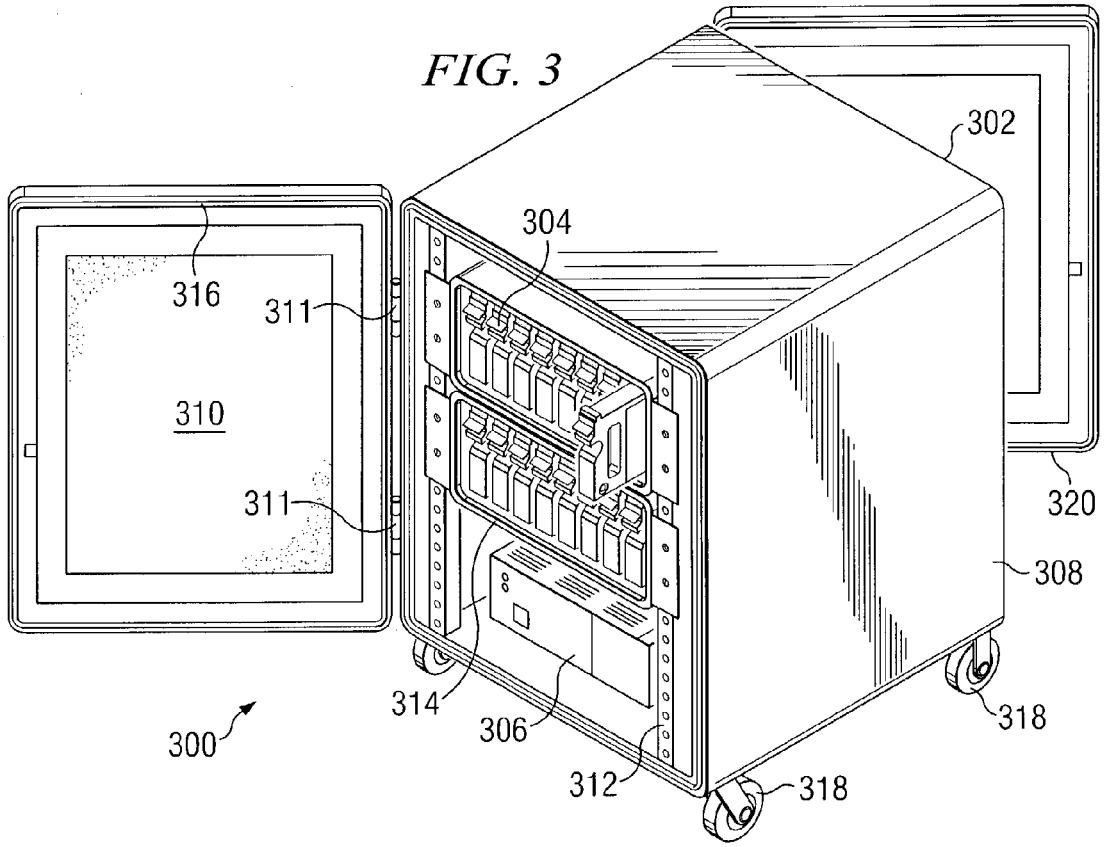
FIG. 3 is a perspective view of a portable storage area network in accordance with one embodiment of the present invention.

In a particular embodiment, storage area network 108, in addition to large capacity storage devices 116, may also include a portable storage area network 118 that itself houses one or more large capacity storage devices 116 and also includes a global uninterruptible power supply 120. Portable storage area network 118, which is described in greater detail below in conjunction with FIG. 3, is itself transportable via a transit case 104*b*, which is described in more detail below.

Connected to storage area network 108 is server 110. Server 110 may be any suitable computing device that includes software that is operable to control the downloading of data from large capacity storage devices 116 to particular disk packs of large capacity storage devices 116, to a single large capacity storage device 116, or to large capacity storage devices 116 associated with portable storage area network 118. Any suitable software may be utilized to control the downloading of the data. As an example, in a military context where the AOI data is stored on large capacity storage devices 116, a suitable software program, such as Raindrop™ from Northrop Grumman Corporation may be utilized. The type of software utilized on server 110 is dependent upon many factors, such as the specific directory structure used for the storage of data on large capacity storage devices 116.

In one embodiment, server 110 may be a personal computer; however, in the illustrated embodiment, users of the software installed on server 110 use one of the work stations 112. Work stations 112 are typically personal computers; however, work stations 112 may be any suitable types of computing devices that can access the software stored on server 110 in order to direct that certain data be downloaded. Workstations 112 may directly couple to server 110 in any suitable manner or a bunch of work stations 112 may be coupled to server 110 via hub 114, which may be any suitable active or passive hub associated with any suitable network, such as a local area network, wide area network, and the like.

To briefly describe an operation of the downloading of certain data from large capacity storage devices 116, a user associated with work station 112 receives a request from a user at destination 106 for a portion of data, such as a particular AOI. The user of workstation 112 then runs the software on server 110 in order to locate and download the requested data to one or more disk packs associated with one or more large capacity storage devices 116. After the downloading is complete, the particular disk packs for large capacity storage devices 116 may then be removed and sent to destination 106 via a transportation device 104.

Transportation device 104 functions to physically send downloaded data that is stored on a hardware device, such as a disk pack, to destination 106. In one embodiment, transportation device 104 includes a transport case 104*a*, which may be any suitable transport case configured to send the hardware device to destination 106. For example, transport case 104*a* may include any suitable plastic case that has any suitable foam therein to pack the disk pack or other storage device in a safe and reliable manner.

In another embodiment, transportation device 104 includes a transit case 104*b*. Transit case 104*b*, which is described in greater detail below in conjunction with FIG. 3, also functions to send the downloaded data on a hardware device to destination 106. However, transit case 104*b* is typically larger than transport case 104*a* and is typically designed for air transportation. Accordingly, transit case 104*b* is typically sized as to conform to the size of a typical pallet 122 used for air transportation. In addition, transit case 104*b* is designed to protect the hardware device therein from environmental conditions including shock and vibration loading and pressure changes. Other suitable transportation devices and transportation methods may be used to physically transfer data from source 102 to destination 106.

Destination 106 is any suitable destination that requests data. For example, in the military context, destination 106 may include a military base that requests information regarding an AOI. In the commercial context, destination 106 may be an automobile manufacturing plant in a particular physical location. In the illustrated embodiment, destination 106 includes a plurality of large capacity storage devices 124 that function to store data. Large capacity storage devices 124 are typically the same type of storage devices as large capacity storage devices 116 at source 102; however, large capacity storage devices 124 may be different than large capacity storage devices 116. It is preferable that large capacity storage devices 124 are compatible with large capacity storage devices 116 because if a disk pack of a particular large capacity storage device 116 is received from source 102 at destination 106 then it may simply be "plugged in" and be ready to be utilized substantially immediately. This "plug-and-play" capability is important especially in military applications.

Large capacity storage devices 124 may be associated with one or more portable storage area networks 126. Portable storage area networks 126 may be the same as portable storage area 118 at source 102; however, portable storage area networks 126 may already exist at destination 106. There may be one or any number of large capacity storage devices 124 associated with each portable storage area network 126 and there may be one or more portable storage area networks 126 associated with destination 106. Although not illustrated in FIG. 1, destination 106 includes any suitable number of computing devices and associated software that is able to extract the information from large capacity storage devices 124 so the data may be utilized by personnel at destination 106.

One technical advantage of the present invention is that a large amount of data from source 102 may be downloaded onto disk packs associated with large capacity storage devices 116 and transported to destination 106 for immediate use by merely "plugging in" the requested, thereby avoiding any lengthy downloading of 8 mm tapes. Sometimes the downloading of 8 mm tapes can take days before the data is usable. This wastes considerable important time, especially in a military context. This "plug-and-play" capability is particularly important in military applications where the data is often very large and military bases could be moved at a moment's notice. Another important advantage of one embodiment of the invention is that the use of portable storage area networks 126 at destination 106 allows data to be moved from location to location with relative ease. This is described in more detail below in conjunction with FIG. 3.

Figure 2:
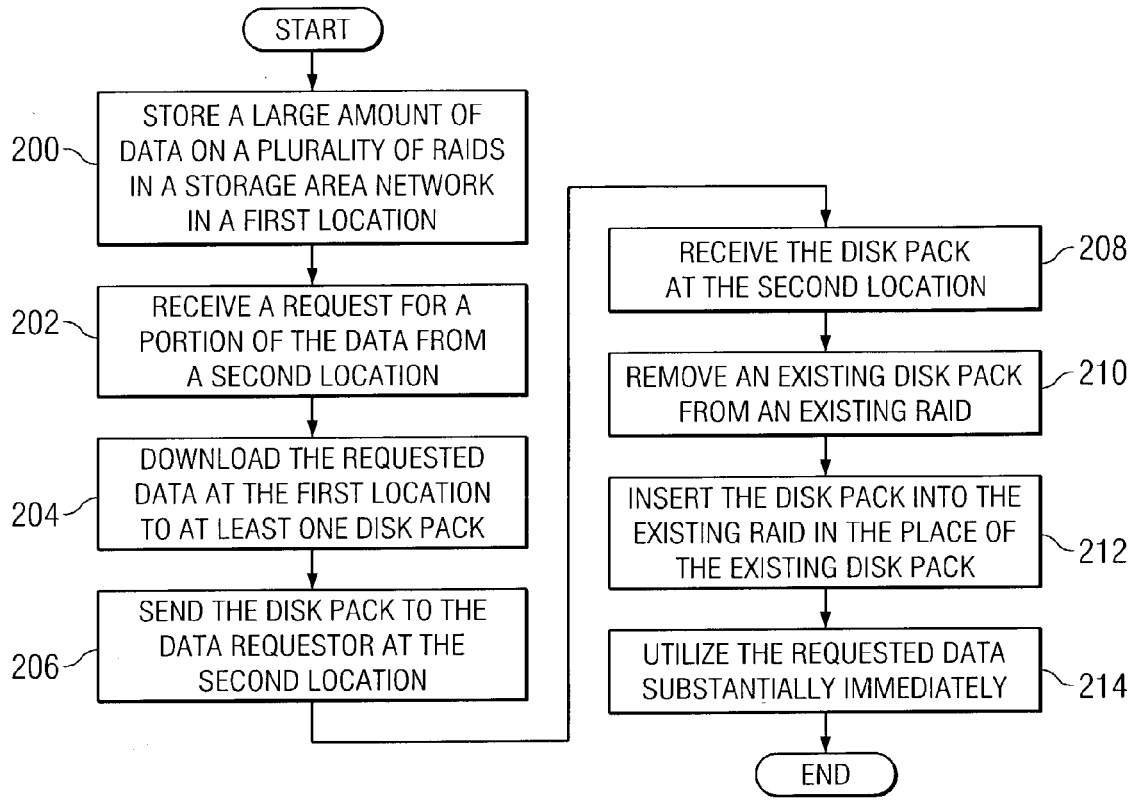
FIG. 2 is a flowchart illustrating a method for transferring large amounts of stored data in accordance with one embodiment of the present invention.

FIG. 2 is a flowchart illustrating a method for transferring large amounts of stored data in accordance with one embodiment of the present invention. The method begins at step 200 where a large amount of data is stored on a plurality of large capacity storage devices 116 associated with storage area network 108 at source 102. At step 202, a request for a portion of the data is received from destination 106. Thereafter, the requested data is downloaded, at step 204, at source 102 to at least one disk pack. As described above, depending on the amount of data requested, the data may be downloaded to one or more storage devices 116.

The hardware device that the requested data is downloaded to, such as a particular disk pack, is then sent to the data requester at destination 106, as denoted by step 206. At step 208, the disk pack or other hardware device is received at destination 106. Before installing the new data, an existing disk pack is removed from an existing large capacity storage device 124 at destination 106, as denoted by step 210. Thereafter, the new disk pack is inserted into the existing large capacity storage device 124 in the place of the existing disk pack that was just removed. The requested data may then be utilized substantially immediately, as denoted by step 214. Substantially immediately means that the system is up and operational, fully mission capable, within "minutes," which is more advantageous than the current "days." This then ends the method as outlined in FIG. 2.

FIG. 3 is a perspective view of a portable storage area network 300 in accordance with one embodiment of the present invention. Portable storage area network 300 is an example of portable storage area networks 118 or 126 of FIG. 1. In the illustrated embodiment, portable storage area network 300 includes a transit case 302 housing a plurality of large capacity storage devices 304 and a global uninterruptible power supply 306. According to the teachings of one embodiment of the present invention, portable storage area network area 300 is a storage area network that is portable. In other words, previous storage area networks are designed only for fixed installations, wherein portable storage area network 300 is designed to be portable such that it may be shipped or sent to a destination, such as destination 106, plugged in and be ready to be utilized substantially immediately. In a conventional storage area network the storage area network would have to be disassembled, shipped to a destination in pieces, and then reassembled which wastes considerable time. The portability of portable storage area network 300 is facilitated mainly through transit case 302.

In the illustrated embodiment, transit case 302 includes a housing 308, a front cover 310, a storage rack 312, a plurality of shock isolators 314, a seal 316, and a plurality of wheels 318. In other embodiments, transit case 302 also has a rear cover 320.

Housing 308, in the illustrated embodiment, is generally rectangular in shape; however, housing 308 may have any shape suitable for housing large capacity storage devices 304 and global uninterruptible power supply 306. Housing 308 may have any suitable size; however, in order for portable storage area network 300 to be transported overseas on an airplane, housing 308 typically has a size that is conducive to the standard 8 foot by 10 foot steel pallets used in air transportation. Housing 308 may also be formed from any suitable material, such as plastic, composite material, or other suitable materials.

Front cover 310 is selectively removable from housing 308 via any suitable method. For example, front cover 310 may be bolted onto housing 308 using any suitable fasteners. In a particular embodiment, front cover 310 is hingedly connected to housing 308 via any suitable number of hinges 311. Cover 310 may also have seal 316 disposed around a perimeter thereof in order to seal the inside contents of housing 308 from the environment when front cover 310 is secured to housing 308. A seal opposing seal 316 may also exist on a perimeter of housing 308 in other embodiments.

Storage rack 312 may be any suitable storage rack coupled to the inside of housing 308 in any suitable manner. Storage rack 312 functions to accept large capacity storage devices 304. For example, large capacity storage devices 304 may be slid into grooves in storage rack 312 and secured using any suitable method. In other embodiments, large capacity storage devices 304 are hard mounted to the inside of housing 308 using any suitable method.

Between storage rack 312 and large capacity storage devices 304 are shock isolators 314 that function to reduce any shock loads or vibration loads encountered by large capacity storage devices 304 during transportation. In one embodiment, shock isolators 314 are designed to meet all applicable military standard specification(s), DoD 7000-1 & 7000-2, and Army Regulation 70-1 "all weather" and "all environment" requirements. Any suitable shock isolators may be utilized; however, in one embodiment, suitable rubber mounts are utilized and they are coupled to storage rack 312 in any suitable manner.

Wheels 318 are any suitable wheels that function to help support the weight of portable storage area network 300, thereby improving the ease of movement of portable storage area network 300 and potentially reducing the lifting of portable storage area network 300 from, for example, a three man lift to a two man lift or less. In the illustrated embodiment, wheels 318 are shown to be coupled to a bottom of housing 308; however, wheels 318 may also be coupled in other suitable places such as the sides of housing 308. Any suitable number of wheels may be utilized. In a particular embodiment, wheels 318 are casters disposed on the bottom of housing 308.

In one embodiment, housing 308 also includes rear cover 320 in addition to front cover 310 that allows access to the rear of large capacity storage devices 304. Rear cover 320 may be similar to front cover 310 in that it may be coupled to housing 308 in any suitable manner and also typically has a seal disposed around the perimeter thereof to function the same as seal 316.

Global uninterruptible power supply 306 may be any suitable power supply having any suitable capacity. In one embodiment, global uninterruptible power supply 306 has a capacity of 2.4 kVa. Although global uninterruptible power supply 306 is shown to be disposed within housing 308, in other embodiments, global uninterruptible power supply 306 is shipped separately from portable storage area 300 and attaches to the outside of housing 308 in any suitable manner.

Although portable storage area network 300 is shown in FIG. 3 to have two large capacity storage devices 304, any suitable number of large capacity storage devices 304 may be disposed within housing 308. Typically however, only two or three large capacity storage devices 304 are utilized to keep the weight of portable storage area network to a level that is easy to handle using two or three personnel. Additional portable storage area networks 300 may be utilized depending on how much data is required to be stored. If two or more portable storage area networks are utilized at a destination, such as destination 106, then these additional portable storage area networks 300 may be disposed next to one another or on top of one another in a stacked configuration (as shown in FIG. 1). In this embodiment, global uninterruptible power supply 306 is able to support more than one portable storage area network 300.

Although embodiments of the invention and some of their advantages are described in detail, a person skilled in the art could make various alterations, additions, and omissions without departing from the spirit and scope of the present invention as defined by the appended claims.

What is claimed is:

1. A system for transferring a large amount of stored data, comprising:
    a transit case;
    a plurality of large capacity storage devices housed within the transit case, each large capacity storage device capable of storing at least approximately 200 gigabytes of data;
    a uninterruptible power supply associated with the transit case; and
    wherein the transit case comprises:
    a housing;
    a front cover selectively removable from the housing;
    shock isolators associated with the large capacity storage devices and operable to reduce shock loading encountered by the large capacity storage devices during transportation of the transit case;
    a seal disposed around a perimeter of the front cover;
    a plurality of wheels coupled to the housing; and
    wherein the transit case has a size that is conducive to eight foot by ten foot steel pallets used in air transportation.

2. The system of claim 1, wherein the stored data is imagery data regarding an area of interest.

3. The system of claim 1, wherein each large capacity storage device is selected from the group consisting of a RAID, a JBOD, and an optical disk.

4. The system of claim 1, wherein each large capacity storage device is a RAID having a storage capacity of at least 1.6 terabytes.

5. The system of claim 4, wherein the plurality of large capacity storage devices includes two or three RAIDs, each RAID having a storage capacity of at least 1.6 terabytes.

6. The system of claim 1, wherein the large capacity storage devices are coupled to one another with an I squared C bus.

7. The system of claim 1, wherein the uninterruptible power supply is a global uninterruptible power supply rated at 2.4 kVa.

8. A system for transferring a large amount of stored data, comprising:
    a transit case;
    a plurality of RAIDs housed within the transit case, each RAID capable of storing at least approximately 1.6 terabytes of data;
    a uninterruptible power supply associated with the transit case; and
    wherein the transit case comprises:
    a generally rectangular housing;
    a front cover selectively removable from the housing;
    a rear cover selectively removable from the housing;
    shock isolators associated with the large capacity storage devices and operable to reduce shock loading encountered by the large capacity storage devices during transportation of the transit case;
    a first seal disposed around a perimeter of the front cover;
    a second seal disposed around a perimeter of the rear cover;
    a plurality of wheels coupled to a bottom of the housing; and
    wherein the transit case has a size that is conducive to eight foot by ten foot steel pallets used in air transportation.

9. The system of claim 8, wherein the data is imagery data regarding an area of interest.

10. The system of claim 8, wherein the plurality of RAIDs includes two or three RAIDs.

11. The system of claim 8, wherein the uninterruptible power supply is a global uninterruptible power supply rated at 2.4 kVa.

* * * * *